United States Patent [19]

Allen

[11] 4,082,105

[45] Apr. 4, 1978

[54] VALVE STEM PACKING ASSEMBLY WITH TEMPERATURE RESPONSIVE SEAL

[75] Inventor: Herbert Allen, Houston, Tex.

[73] Assignee: Carmeron Iron Works, Inc., Houston, Tex.

[21] Appl. No.: 751,461

[22] Filed: Dec. 17, 1976

[51] Int. Cl.² ............................................. F16K 41/00
[52] U.S. Cl. ..................................... 137/72; 251/214; 277/26
[58] Field of Search .................... 277/26, 28, 9.5, 236; 137/72, 73, 74; 251/214

[56] References Cited

U.S. PATENT DOCUMENTS

| 2,647,721 | 8/1953 | Volpin | 137/72 |
| 3,177,887 | 4/1965 | Priese | 137/74 |
| 3,606,348 | 9/1971 | Taylor | 277/26 |
| 3,630,483 | 12/1971 | Canalizo | 137/72 X |
| 3,990,465 | 11/1976 | Allen | 137/72 |

Primary Examiner—Martin P. Schwadron
Assistant Examiner—Richard Gerard

[57] ABSTRACT

There is disclosed a valve having means for providing a secondary stem seal in the event the primary packing for the stem is destroyed by heat.

12 Claims, 3 Drawing Figures

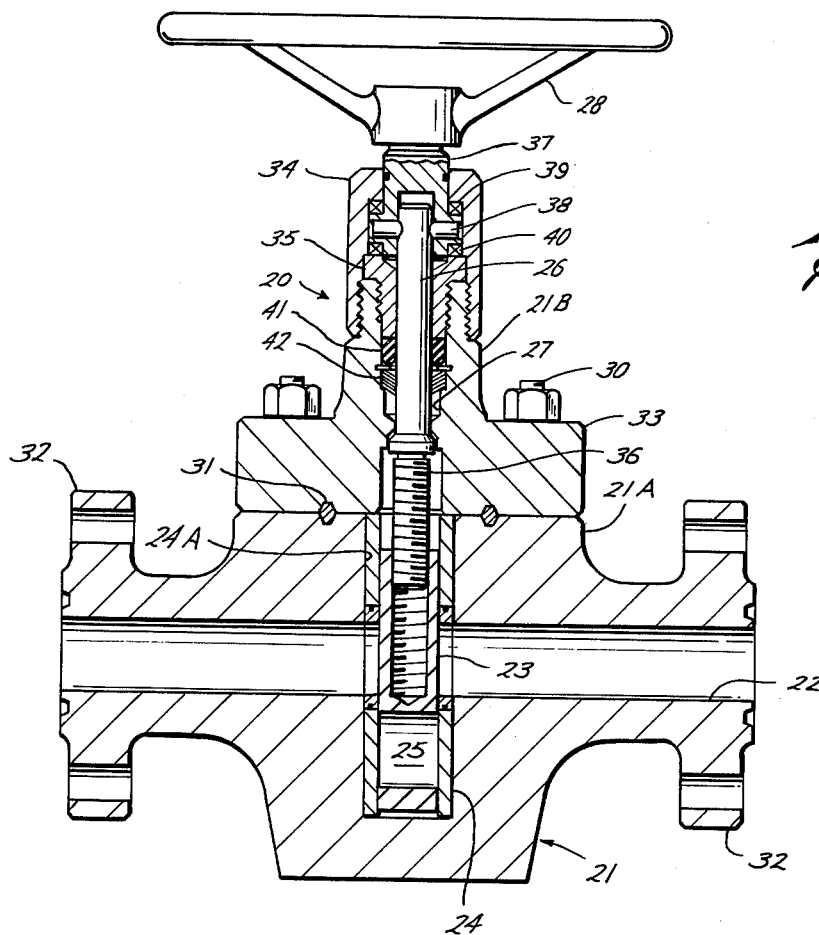
Fig. 1
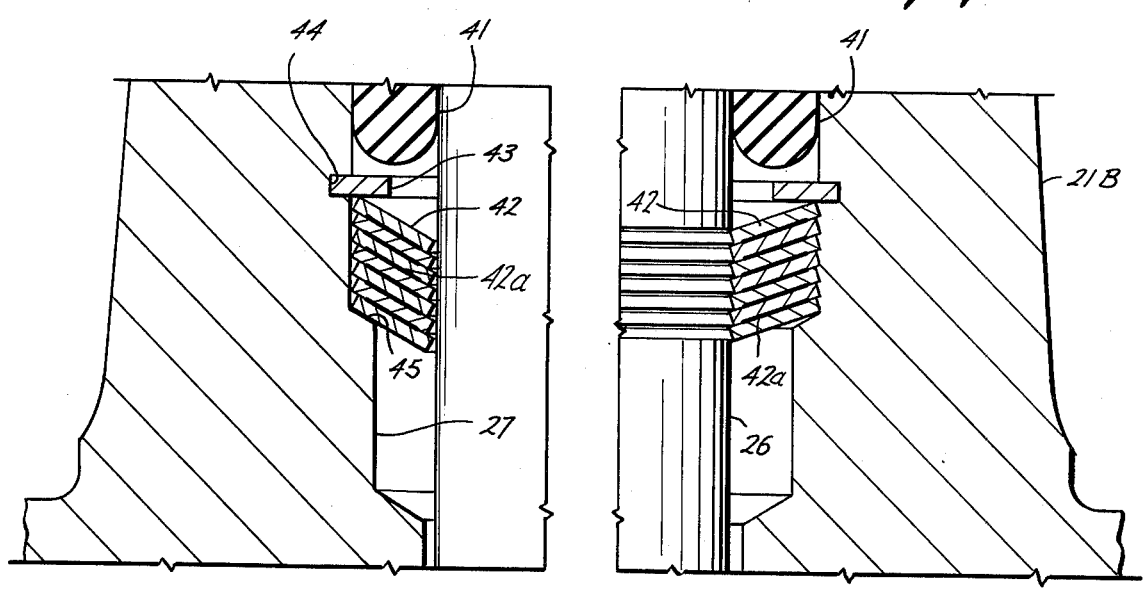
Fig. 2
Fig. 3

VALVE STEM PACKING ASSEMBLY WITH TEMPERATURE RESPONSIVE SEAL

This invention relates to a valve of the type in which a stem for operating a closure member within the body of the valve extends through a packing of resilient material disposed within an annular space between the stem and an opening connecting the interior with the exterior of the body. More particularly, it relates to improvements in valves of this type having means for forming a secondary seal between the stem and the opening so as to prevent leakage from the valve in the event the resilient material of the packing is destroyed by heat due to a fire or other source of high temperature near the valve.

U.S. Pat. No. 2,647,721 shows a valve of this type in which such a secondary seal is adapted to be formed by engagement of a shoulder on the operating stem with a shoulder on the inner end of the opening in the body. Under normal conditions, the stem shoulder is held in spaced relation from the shoulder on the body by means of a fusible element disposed within the annular space between the stem and the opening in which the packing is disposed. This element is of a material which will fuse at a temperature which is greater than that ordinarily encountered by the valve, but less than that at which the resilient material of the packing is destroyed. Upon fusion of this element, the stem shoulder is urged into engagement with the body shoulder by line pressure in the vessel which is effective over the stem prior to destruction of the packing.

The materials from which these fusible elements are made are known to creep under loading, such as that imposed on the stem by the force due to line pressure. More particularly, the rate at which creep occurs is proportional to the amount of loading. Thus, creep of the fusible element may permit the stem shoulder to move into the body shoulder at a temperature other than that anticipated. Also, of course, since it is confined within the annular space between the stem and opening, the fusible element will, during normal operation of the valve, create a frictional drag on movement of the stem.

An object of this invention is to provide a valve of this type in which a secondary seal is formed independently of line pressure and without increasing the frictional load on the stem.

A further object is to provide such a valve in which the secondary seal may be incorporated with little or no modification of the existing valve body.

Another object is to provide a valve having a secondary seal which is relatively inexpensive to manufacture.

These and other objects are accomplished, in accordance with the illustrated embodiment of the present invention, by a valve in which the secondary seal comprises at least one relatively rigid, spring-like annular element disposed within the annular space in which the packing is disposed, and a means for holding each such element in a distorted shape in which its outside diameter is closely received within the opening in the body and its inside diameter is greater than and substantially concentric with the outside diameter of the stem. The holding means is fusible at a temperature lower than that at which the packing is destroyed to permit each said annular element to return toward an undistorted shape in which its inside diameter is forced against the outside diameter of the stem and its outside diameter is forced against the body opening, so that the space between them will be closed prior to destruction of the packing by heat.

Preferably, there are a plurality of such annular elements arranged in stacked, substantially coaxial relationship, whereby relatively thin, and thus more readily distortable, elements may be used without sacrificing the ability of the secondary seal to contain pressure within the valve. It is also preferred that the elements be Belleville type springs which are held in their distorted shapes by solder or other fusible material between their adjacent faces.

Although the tendency for each element to return to its undistorted shape will preload the means for holding it in its distorted shape, this preload is independent of pressure within the vessel, and thus its effect ordinarily may be better predicted. Also, since, under normal operating conditions, they are spaced from the stem, the elements impose no frictional load on it.

In the drawings:

FIG. 1 is a vertical sectional view of a valve constructed in accordance with the present invention;

FIG. 2 is an enlarged sectional view of a portion of the valve, showing the secondary seal during normal operating conditions of the valve; and FIG. 3 is a sectional view of a portion of the valve similar to FIG. 2, but upon movement of the secondary seal into position to close the annular space in which it's disposed.

With reference now to the details of the abovedescribed drawings, the overall valve, which is indicated in its entirety by the reference character 20, includes a valve body 21 having a passageway 22 therethrough, and a closure member 23 which is mounted within the valve body for movement between positions opening and closing the passageway. In the illustrated embodiment of the invention, the closure member is a gate which is vertically reciprocable between ported plates 24 mounted within a recess 24A in the valve body which extends across passageway 22. More particularly, the gate is of a through conduit type having a hole 25 adapted to be moved between a lower closed position in which it is disposed between the plates, and an upper open position in which it is aligned with the ports through the plates and the passageway.

The gate is moved between opened and closed positions by means of a stem 26 connected to the gate and extending through an opening 27 in the valve body which forms an upward continuation of recess 24A. The stem is of a non-rising type having its lower end threaded to the upper end of gate 23, and an intermediate portion thereof rotatably mounted within bearings in the opening, as will be described below. A handwheel 28 is connected to the outer upper end of the stem for rotating it so as to transmit vertical movement to the gate through its threaded connection to the stem.

The valve body 21 comprises a main housing 21A in which passageway 22 and recess 24A are formed, and a bonnet 21B in which stem opening 27 is formed. The lower end of the bonnet is releasably connected to the upper end of the main housing by means of studs 30 and sealed with respect thereto by means of a gasket 31 held between their opposing ends. The valve is adapted to be connected in a pipeline or the like by means of flanges 32 on opposite sides of the main housing, so that the bonnet may be removed, replaced and repaired without disconnection of the main housing from the line.

The bonnet 21B includes a lower body part 33 having a flange through which studs 30 extend, a gland nut 35 threaded to the inner diameter of the upper end of body part 33, and a cap 34 surrounding the upper end of the gland and threadedly connected to the outer diameter of the upper end of body part 33. The stem includes a lower end 36 which extends through the lower end of opening 27 to threadedly connect with the upper end of the gate, and an upper end 37 which extends through a hole through cap 34 to connect with the handwheel 28. The upper and lower ends of the stem are releasably connected by means of a cross pin 38 which is received through a flanged portion of the lower end of the stem, and the flanged portion is held down on the top of gland 35 by means of upper and lower bearings 39 and 40, respectively, carried within an annular space between the cap and stem.

A packing 41 is carried within opening 27 beneath gland nut 35 for sealing between the stem and opening. As previously noted, this packing is made of resilient material, such as rubber or rubber-like material, or plastic, such as Teflon, which is destructible by heat at temperatures substantially lower than that which would destroy the remainder of the valve.

The secondary seal comprises a stack of relatively rigid, spring-like annular elements 42 disposed within opeing 27 beneath the packing. The outer diameter of the stack is prevented from moving vertically within the space by means of a snap ring 43 releasably held within a groove 44 in the opening beneath packing 41 and a shoulder 45 above a reduced diameter portion at the opening.

As previously described, the individual annular elements making up the stack are preferably Belleville type springs, each of which is distortable into the preloaded shape shown in FIG. 2, wherein their outer diameters are closely received within the opening, while their inner diameters are spaced from the outside diameter of the stem. In this manner, during normal operating conditions, there is no engagement between the secondary seal and the stem, and thus no additional frictional drag on the stem as it is rotated to move the closure member between opened and closed positions. As also shown in FIG. 2, when so distorted, the annular elements form an acute angle with respect to a horizontal plane which is substantially equal to the angle formed by shoulder 45 with respect thereto.

Annular elements 42 are held in the distorted position of FIG. 2 by means of solder 42a or other fusible material disposed between adjacent faces. More particularly, and as previously described, this solder is of such composition that it will fuse, and thus release the annular elements for return toward undistorted positions, at a temperature which is not substantially higher than that at which packing 41 is destroyed. At the same time, of course, this preselected temperature level is above that normally present near the valve during normal operating conditions, and preferably close to the destruction temperature of the packing, so that the secondary seal is not activated unless destruction of the packing is imminent. Although the solder or other fusible material holding elements 42 in the position of FIG. 2 may be subject to creep, the extent of creep is ordinarily predictable since there is no force due to line pressure thereon.

When the annular elements are so released, they will move toward their undistorted positions, and thus as can be seen from a comparison of FIGS. 2 and 3, into flatter shapes. However, the annular elements are so selected that before reaching their normal undistorted positions, they will engage tightly with the outside diameter of the stem and the inside diameter of opening 27 so as to close the annular space. Thus, as indicated in FIG. 3, the inner diameters of the Belleville springs will bite into the outer diameter of the stem, and the outer diameters thereof will bite into the opening the depths of the bites being dependent on the extent to which they are still distorted or preloaded and on the hardness of the materials. In any event, the extent of the bite illustrated in FIG. 3 is exaggerated.

As previously described, since there are a number of these springs, each may be sufficiently thin as to be readily distortable. However, in combination, the springs provide a rigid barrier across the annular space, which not only seals between the stem and opening, but also resists upwardly directed forces due to line pressure acting thereover.

As will be appreciated from the foregoing, existing valves may be provided with this secondary seal with little or no modification. For example, it may be found that the opening in the bonnet for receiving packing 41 is of such size as to receive the stack of springs without modification other than the formation of groove 44 to receive snap ring 45. Even if the opening is not deep enough for this purpose, it may be machined to the desired length without modification of other parts of the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a valve body having a passageway therethrough and an opening therein connecting the passageway with the exterior of the body, a closure member mounted within the body for opening and closing the passageway, a stem extending through the opening and connecting with the closure member for moving it between opened and closed positions, said stem being spaced from the opening to define an annular space therebetween, a packing of resilient material disposed within the space for sealing between the stem and the opening, at least one relatively rigid, spring-like annular element disposed within said space, and means holding each said element in a distorted shape in which its outside diameter is closely received within the opening and its inside diameter is greater than and substantially concentric with the outside diameter of the stem, said holding means being fusible at a desired temperature to permit each said annular element to return toward an undistorted shape in which its inside diameter is forced against the outside diameter of the stem and its outside diameter is forced against the opening, whereby the space may be closed despite destruction of the packing by heat.

2. A valve of the character defined in claim 1, wherein there are a plurality of said annular elements arranged in stacked, substantially coaxial relationship.

3. A valve of the character defined in claim 2, wherein said holding means comprises a fusible material between adjacent faces of the annular elements.

4. A valve of the character defined in claim 1, wherein each annular element is a Belleville spring.

5. A valve of the character defined in claim 2, wherein all of said annular elements are Belleville springs.

6. A valve of the character defined in claim 3, wherein all of said annular elements are Belleville springs.

7. A bonnet assembly for a valve, comprising a body having an opening therethrough, an operating stem extending through the opening to define an annular space therebetween, a packing of resilient material disposed within the space for sealing between the stem and the opening, at least one relatively rigid, spring-like annular element disposed within said space, and means holding each said element in a distorted shape in which its outside diameter is closely received within the opening and its inside diameter is greater than and substantially concentric with the outside diameter of the stem, said holding means being fusible at a desired temperature to permit each said annular element to return toward an undistorted shape in which its inside diameter is forced against the outside diameter of the stem and its outside diameter is forced against the opening, whereby the space may be closed despite destruction of the packing by heat.

8. A bonnet of the character defined in claim 7, wherein there are a plurality of said annular elements arranged in stacked, substantially coaxial relationship.

9. A bonnet of the character defined in claim 8, wherein said holding means comprises a fusible material between adjacent faces of the annular elements.

10. A valve of the character defined in claim 7, wherein each annular element is a Belleville spring.

11. A valve of the character defined in claim 8, wherein all of said annular elements are Belleville springs.

12. A valve of the character defined in claim 9, wherein all of said annular elements are Belleville springs.

* * * * *